United States Patent
Hoshino

(10) Patent No.: US 9,628,715 B2
(45) Date of Patent: Apr. 18, 2017

(54) PHOTOGRAPHING EQUIPMENT, PHOTOGRAPHING ASSISTING METHOD, DISPLAY APPARATUS AND DISPLAY METHOD

(71) Applicant: Olympus Corporation, Hachioji-shi, Tokyo (JP)

(72) Inventor: Tomohiro Hoshino, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/270,625

(22) Filed: May 6, 2014

(65) Prior Publication Data

US 2014/0333793 A1 Nov. 13, 2014

(30) Foreign Application Priority Data

May 7, 2013 (JP) ................................. 2013-097836

(51) Int. Cl.
*H04N 5/232* (2006.01)
*H04N 5/235* (2006.01)

(52) U.S. Cl.
CPC ..... *H04N 5/23293* (2013.01); *H04N 5/23216* (2013.01); *H04N 5/23219* (2013.01); *H04N 5/23222* (2013.01); *H04N 5/235* (2013.01); *H04N 5/23209* (2013.01); *H04N 5/23212* (2013.01); *H04N 5/23245* (2013.01)

(58) Field of Classification Search
USPC ............... 348/222.1, 333.01, 333.02, 333.05
See application file for complete search history.

(56) References Cited

U.S. PATENT DOCUMENTS

| | | | | |
|---|---|---|---|---|
| 6,301,440 | B1* | 10/2001 | Bolle ................ | G06K 9/00664 348/229.1 |
| 8,508,622 | B1* | 8/2013 | Anon .................... | H04N 5/2621 348/222.1 |
| 2007/0030363 | A1* | 2/2007 | Cheatle et al. ............... | 348/239 |
| 2008/0013799 | A1* | 1/2008 | Steinberg ........... | G06K 9/00228 382/118 |
| 2009/0160968 | A1* | 6/2009 | Prentice ............. | H04N 5/23245 348/223.1 |
| 2009/0175551 | A1* | 7/2009 | Thorn .......................... | 382/254 |
| 2010/0201848 | A1* | 8/2010 | Fukui ................ | H04N 5/23219 348/234 |
| 2010/0321525 | A1* | 12/2010 | Nagata ............... | H04N 5/23216 348/230.1 |

(Continued)

FOREIGN PATENT DOCUMENTS

JP 2010-252074 11/2010

*Primary Examiner* — Twyler Haskins
*Assistant Examiner* — Akshay Trehan
(74) *Attorney, Agent, or Firm* — John C. Pokotylo; Straub & Pokotylo

(57) ABSTRACT

Photographing equipment includes an image pickup unit which picks up an image of an object to obtain a picked up image, a display unit which displays the picked up image, a portion determining unit which sets an inspection area at the picked up image displayed on the display unit, an analyzing unit which analyzes at least one of an image and a setting associated with the inspection area, and a search unit which obtains a factor of a defect of the image of the inspection area by referring to a database provided in advance using an analysis result of the analyzing unit.

12 Claims, 14 Drawing Sheets

| PARTIAL DETERMINATION | | DETERMINATION ELEMENT | | | |
|---|---|---|---|---|---|
| | | EXPOSURE | COLOR | FOCUS | BLUR |
| IMAGE CHARACTERISTICS | SATURATION | O | O | | |
| | DEFICIENCY | O | O | | |
| | MOTION VECTOR | | | | O |
| | PHASE DIFFERENCE | | | O | |
| | CONTRAST | | | O | O |

| WHOLE DETERMINATION | | DETERMINATION ELEMENT | | | |
|---|---|---|---|---|---|
| | | EXPOSURE | COLOR | FOCUS | BLUR |
| IMAGE CHARACTERISTICS | HISTOGRAM | O | | | |
| | COLOR TEMPERATURE | | O | | |
| | FOCUS ADJUSTMENT | | | O | |
| | CAMERA SHAKE on/off | | | | O |
| | SHUTTER SPEED | | | | O |

(56) References Cited

U.S. PATENT DOCUMENTS

| | | | |
|---|---|---|---|
| 2011/0013039 A1* | 1/2011 | Aisaka | H04N 5/142 |
| | | | 348/222.1 |
| 2011/0292221 A1* | 12/2011 | Gu et al. | 348/207.1 |
| 2011/0292242 A1* | 12/2011 | Imai | H04N 5/23216 |
| | | | 348/229.1 |
| 2012/0098968 A1* | 4/2012 | Schofield | G06K 9/00818 |
| | | | 348/148 |
| 2012/0099012 A1* | 4/2012 | Ryu et al. | 348/333.01 |
| 2012/0188386 A1* | 7/2012 | Kulkarni et al. | 348/208.11 |

\* cited by examiner

FIG.2A

| PARTIAL DETERMINATION | | DETERMINATION ELEMENT | | | |
|---|---|---|---|---|---|
| | | EXPOSURE | COLOR | FOCUS | BLUR |
| IMAGE CHARACTERISTICS | SATURATION | ○ | ○ | | |
| | DEFICIENCY | ○ | ○ | | |
| | MOTION VECTOR | | | | ○ |
| | PHASE DIFFERENCE | | | ○ | |
| | CONTRAST | | | ○ | ○ |

FIG.2B

| WHOLE DETERMINATION | | DETERMINATION ELEMENT | | | |
|---|---|---|---|---|---|
| | | EXPOSURE | COLOR | FOCUS | BLUR |
| IMAGE CHARACTERISTICS | HISTOGRAM | ○ | | | |
| | COLOR TEMPERATURE | | ○ | | |
| | FOCUS ADJUSTMENT | | | ○ | |
| | CAMERA SHAKE on/off | | | | ○ |
| | SHUTTER SPEED | | | | ○ |

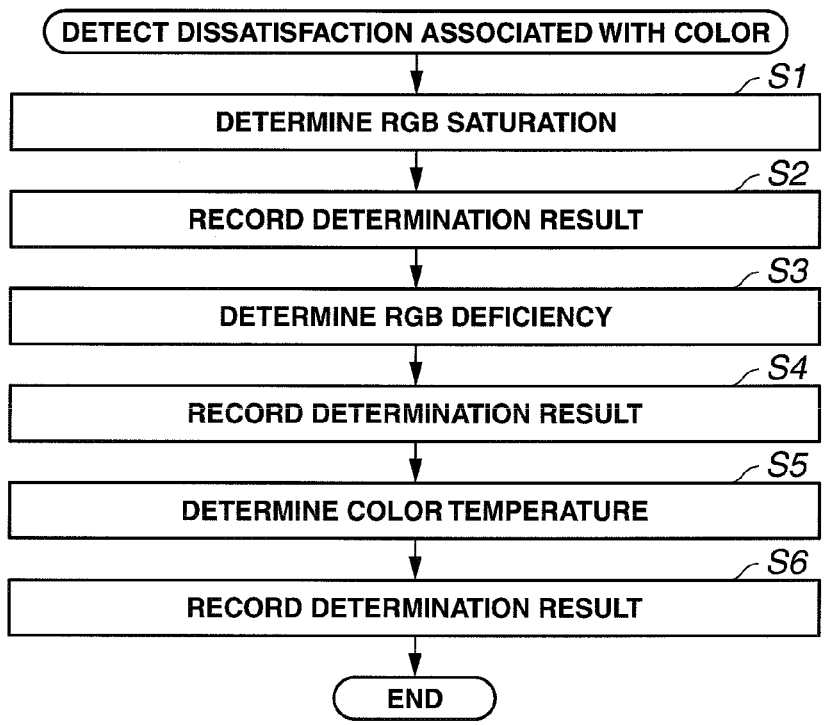
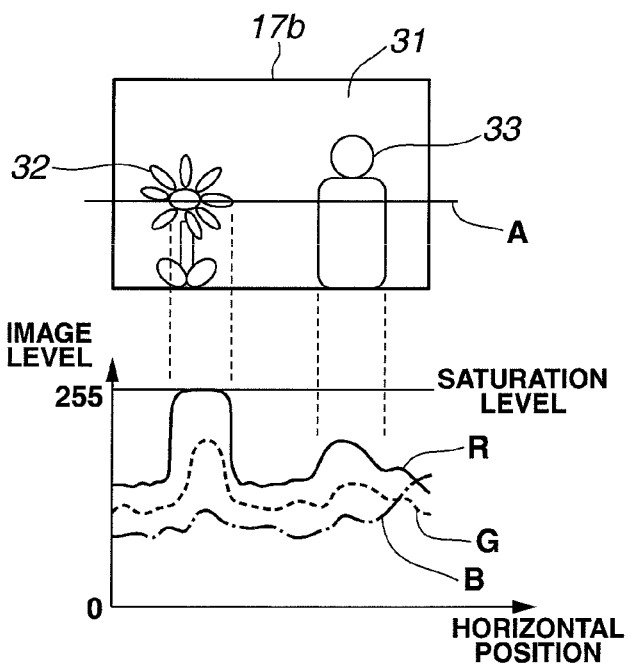

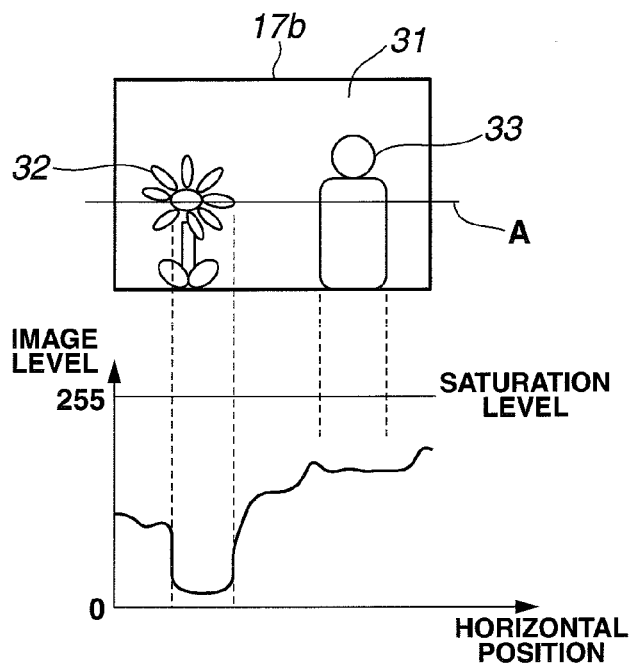
FIG.9A
FIG.9B
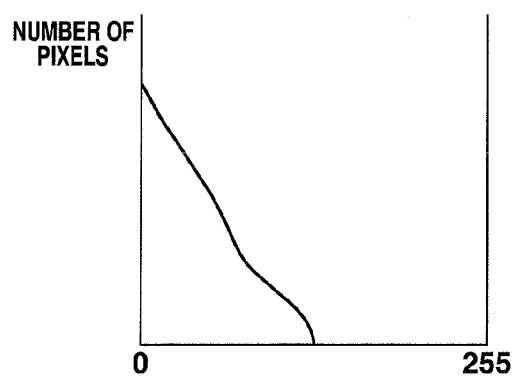
FIG.10A
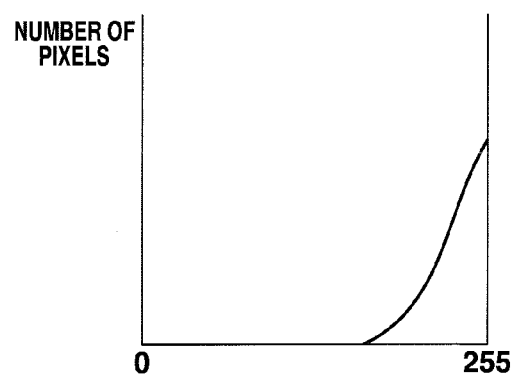
FIG.10B

FIG.11
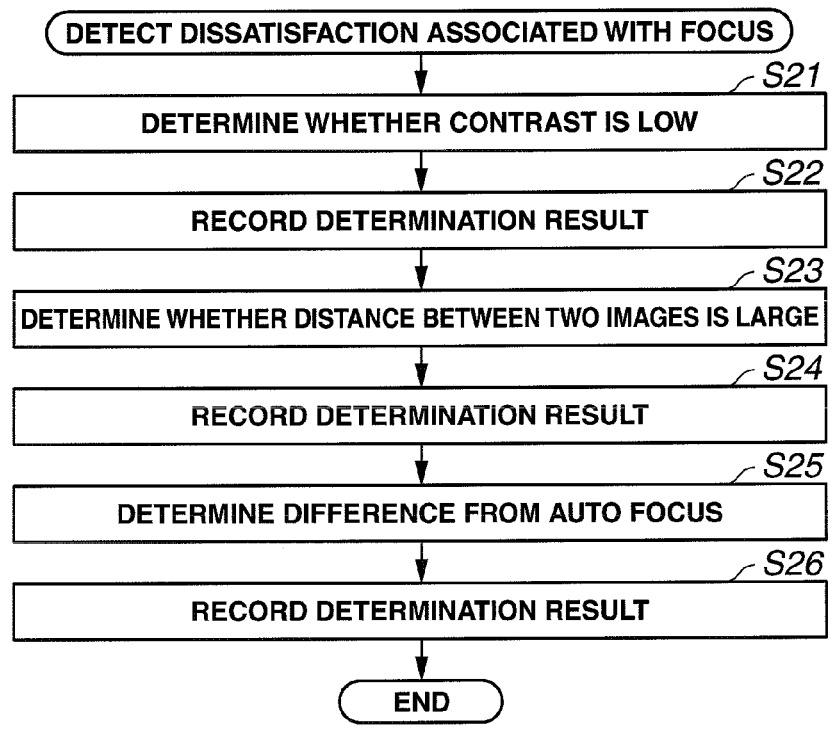
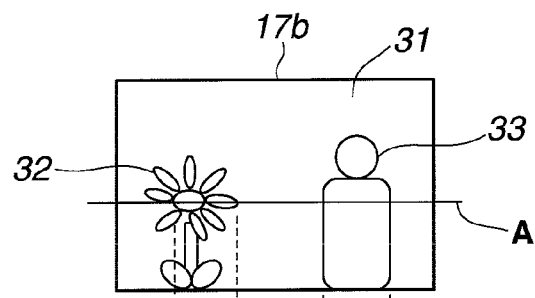
FIG.12A
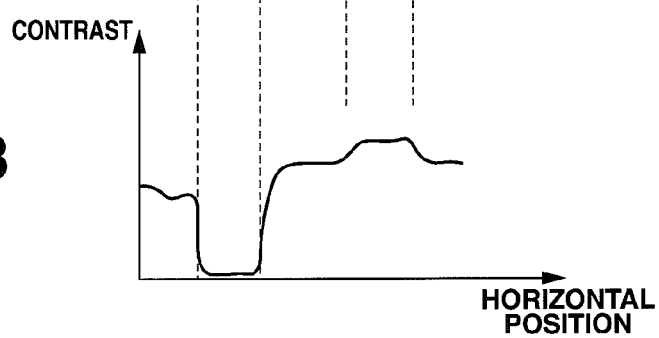
FIG.12B

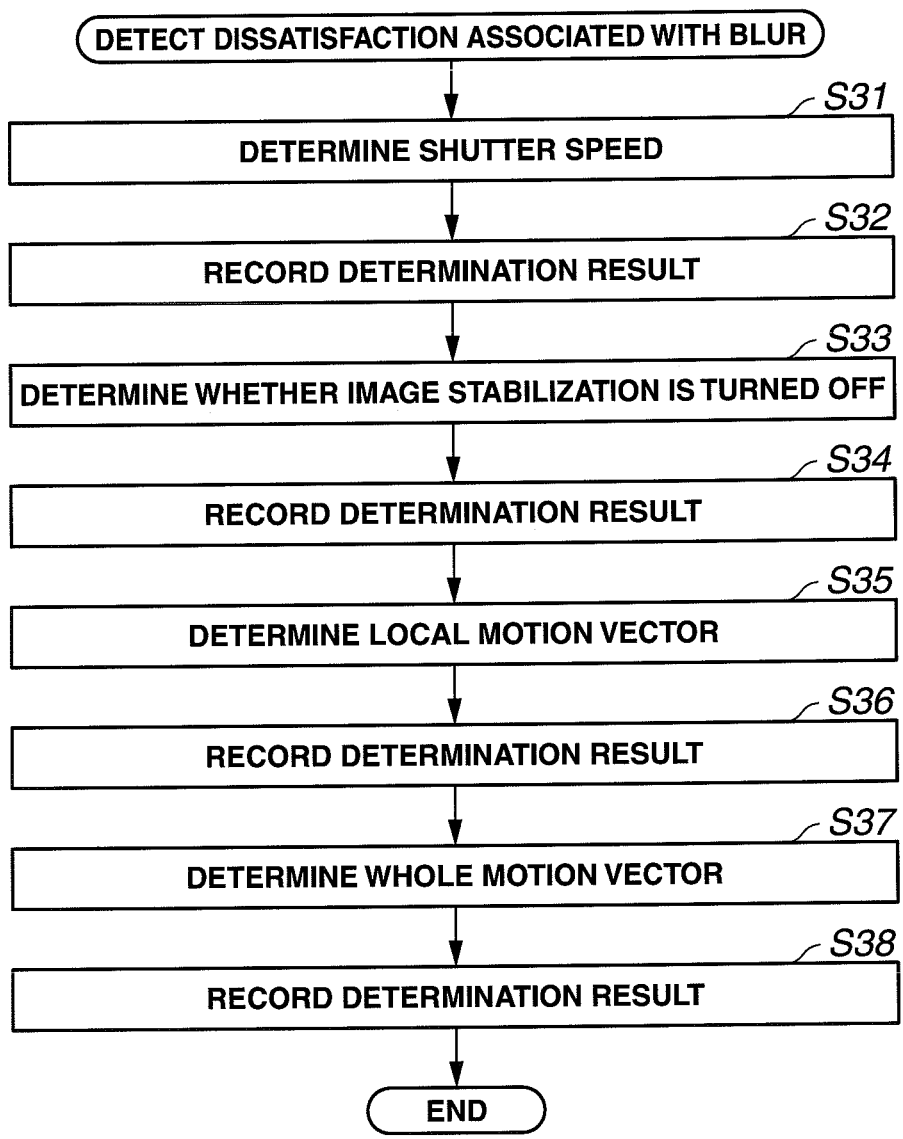

PHOTOGRAPHING EQUIPMENT, PHOTOGRAPHING ASSISTING METHOD, DISPLAY APPARATUS AND DISPLAY METHOD

CROSS REFERENCE TO RELATED APPLICATION

This application claim is benefit of Japanese Application No. 2013-097836 filed in Japan on May 7, 2013, the contents of which are incorporated by this reference.

BACKGROUND OF THE INVENTION

1. Field of the Invention

The present invention relates to photographing equipment, a photographing assisting method, a display apparatus and a display method which are suitable for use in an apparatus provided with a touch panel. The present invention can be applied to a personal digital assistant having a photographing and a display functions and an industrial and a medical observation apparatuses as well as a consumer camera.

2. Description of the Related Art

In recent years, portable equipment (photographing equipment) such as a digital camera, which is provided with a photographing function has been widely spread. Such types of photographing equipment include equipment having a display unit and a function for displaying a photographed image. Further, there is also equipment which displays a menu screen on a display unit to facilitate operation of the photographing equipment. Still further, there is also equipment which can be operated through touch operation performed on a touch panel which is arranged at a display panel to improve operability.

Such types of photographing equipment include equipment which has an auto mode for automatically setting various photographing parameters to optimal values. For example, various auto modes such as an auto focus function for automatically adjusting focus and a color temperature automatically adjusting function for setting a color temperature to an optimal value are employed.

Further, in order to enable a wide variety of video expression, in addition to the auto mode, a manual mode for manually setting various photographing parameters is also employed. However, because a general user is not always familiar with settings of all photographing parameters using the auto mode and the manual mode, photographing which is intended by the user is not always performed.

Accordingly, Japanese Patent Application Laid-Open Publication No. 2010-252074 discloses photographing equipment in which a mode is automatically selected.

SUMMARY OF THE INVENTION

Photographing equipment according to the present invention includes an image pickup unit which picks up an image of an object to obtain a picked up image, a display unit which displays the picked up image, a portion determining unit which sets an inspection area in the picked up image displayed on the display unit, an analyzing unit which analyzes at least one of an image and a setting associated with the inspection area, and a search unit which obtains a factor of a defect the image of the inspection area by referring to a database provided in advance using an analysis result of the analyzing unit.

Further, a photographing assisting method according to the present invention includes a step of picking up an image of an object to obtain a picked up image, a step of displaying the picked up image, a step of setting an inspection area in the displayed picked up image, a step of analyzing at least one of an image and a setting associated with the inspection area to obtain an analysis result, and a step of obtaining a factor of a defect relating to operation of photographing and observation of the image of the inspection area by referring to a database provided in advance using the analysis result.

Still further, a display apparatus according to the present invention includes a display unit which displays an image, a portion determining unit which sets an inspection area in a picked up image displayed on the display unit, an analyzing unit which analyzes at least one of an image and a setting associated with the inspection area, and a search unit which obtains a factor of a defect of the image of the inspection area by referring to a database using an analysis result of the analyzing unit.

Further, a display method according to the present invention includes a display step of displaying an image, a portion determining step of setting an inspection area in a picked up image displayed on the display unit, an analyzing step of analyzing at least one of an image and a setting associated with the inspection area, and a search step of obtaining a factor of a defect caused when the image of the inspection area is observed by referring to a database using an analysis result of the analyzing unit to determine display information from the database.

The above and other objects, features and advantages of the invention will become more clearly understood from the following description referring to the accompanying drawings.

BRIEF DESCRIPTION OF THE DRAWINGS

FIG. 2A and FIG. 2B are explanatory diagrams for explaining content of a failure DB 19a;

FIG. 3 is a flowchart for explaining a method for obtaining a dissatisfaction factor associated with an image pickup state;

FIG. 4A and FIG. 4B are explanatory diagrams for explaining a method for obtaining a dissatisfaction factor associated with an image pickup state;

FIG. 9A and FIG. 9B are explanatory diagrams for explaining a method for obtaining a dissatisfaction factor associated with an image pickup state;

FIG. 10A and FIG. 10B are explanatory diagrams for explaining a method for obtaining a dissatisfaction factor associated with an image pickup state;

FIG. 11 is a flowchart for explaining a method for obtaining a dissatisfaction factor associated with an image pickup state;

FIG. 12A and FIG. 12B are explanatory diagrams for explaining a method for obtaining a dissatisfaction factor associated with an image pickup state;

FIG. 14 is a flowchart for explaining a method for obtaining a dissatisfaction factor associated with an image pickup state;

DETAILED DESCRIPTION OF THE PREFERRED EMBODIMENTS

Embodiments of the present invention will be described in detail below with reference to the drawings.

Figure 1:
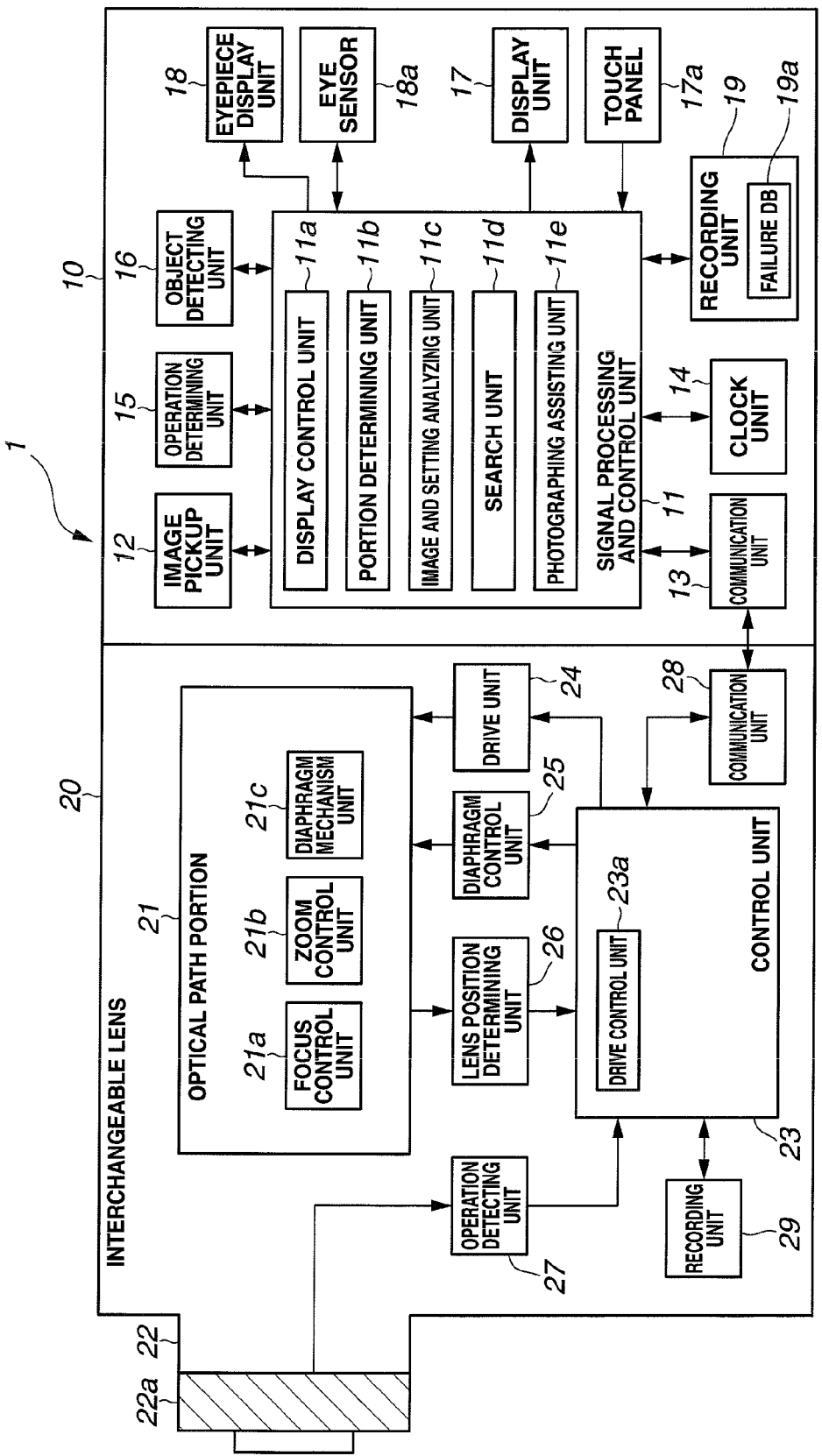
FIG. 1 is a block diagram illustrating photographing equipment according to one embodiment of the present invention.

FIG. 1 is a block diagram illustrating photographing equipment according to one embodiment of the present invention. In the present embodiment, a database (failure database) for characteristics of an image and a setting of a photographing parameter which will make a user dissatisfied with a picked up image is provided at a recording unit, or the like, so that it is possible to present a factor of a defect of an image to the user and effectively assist the user to set a photographing parameter to obtain a picked up image which may be preferred by the user. By this means, it is possible to call attention that it is better to perform photographing again upon photographing or that it is better to be careful next time. This attention not only assumes improvement of visualization of an image, but also assumes to solve a defect due to photographing operation which can be solved by the user or a defect due to control in association with the photographing operation by specifically explaining a defect caused upon photographing and providing advice. Of course, this feature can be applied to an observation apparatus so that advice for improving visualization is provided when a live view image is touched.

When an object is photographed, the photographed result often differs from the object being viewed and sensed in image quality (due to an inappropriate factor). However, because there is a number of photographing parameters in photographing equipment and it is impossible for a beginner to make an instant judgment as to what kind of operation will lead to what kind of effect, there are many cases where although a user performs erroneous operation, the user neither notices that setting is changed by the erroneous operation nor knows how to restore the setting.

Photographing equipment 1 of the present embodiment is configured with a body portion 10 and an interchangeable lens 20. The body portion 10 stores a main circuit portion of the photographing equipment 1, and the interchangeable lens 20 is detachably attached to a front face.

The interchangeable lens 20 has an optical path portion 21 which guides an object image to an image pickup unit 12 of the body portion 10 inside a lens barrel 22. The optical path portion 21 is configured such that a plurality of lenses (not shown) are arranged on an optical axis which leads from an object side to an image pickup surface (image surface) of the image pickup unit 12. That is, the optical path portion 21 includes inside a focus lens which is movable for setting a focus (focusing) state by focusing operation and a zoom lens which changes magnification in a focused state. Further, the optical path portion 21 has a focus control unit 21a, a zoom control unit 21b and a diaphragm mechanism unit 21c which drive these lenses and a diaphragm.

The focus control unit 21a and the zoom control unit 21b are controlled by a drive unit 24 to control the focus lens and the zoom lens. Further, the diaphragm mechanism unit 21c is controlled by a diaphragm control unit 25 to drive the diaphragm (not shown). The diaphragm is, for example, arranged between predetermined lenses of the optical path portion 21.

The lens barrel 22 is provided with an operation ring 22a for allowing the user to set and operate a parameter regarding photographing, for example, a parameter regarding zoom and a diaphragm. An operation detecting unit 27 detects user operation for the operation ring 22a and outputs the detection result to a control unit 23. The control unit 23 which is configured with a microcomputer, or the like, controls each unit based on the detection result of the operation detecting unit 27 and a signal from a signal processing and control unit 11 of the body portion 10 which will be described later.

A drive control unit 23a of the control unit 23 generates various control signals according to the detection result of the operation detecting unit 27 and control of the signal processing and control unit 11. For example, the drive control unit 23a generates a focus signal and a zoom signal to control the drive unit 24. Further, the drive control unit 23a generates a diaphragm control signal to control the diaphragm control unit 25.

The drive unit 24 drives and controls the focus control unit 21a based on the focus signal, and drives and controls the zoom control unit 21b based on the zoom signal. Further, the diaphragm control unit 25 drives and controls the diaphragm mechanism unit 21c based on the diaphragm control signal.

The focus control unit 21a outputs a signal corresponding to a position of a lens to a lens position determining unit 26. Further, the zoom control unit 21b outputs a signal corresponding to a position of the zoom lens (zoom position) to the lens position determining unit 26. The lens position determining unit 26 determines a focus position and a zoom position and outputs the determination result to the control unit 23. The control unit 23 controls the drive unit 24 using the determination result of the focus position and the zoom position so that the focus position and the zoom position are a focus position and a zoom position according to rotation operation and the control signal from the signal processing and control unit 11.

The interchangeable lens 20 has a communication unit 28. Further, the body portion 10 has a communication unit 13. The communication unit 28 transmits and receives information with the communication unit 13 of the body portion 10 via a predetermined transmission path. When communication with the communication unit 13 of the body portion 10 is established, the control unit 23 can transmit lens-specific information, information regarding zoom operation and information such as the focus position and a diaphragm state stored in a recording unit 29 to the body portion 10 through the communication units 28 and 13 as lens information.

Note that the lens information includes a table of a current focus distance, an F value, or the like and also includes a table of a shortest focus distance according to a zoom state, an infinity distance, or the like. The lens information enables the body portion 10 to recognize what kind of a zoom function the interchangeable lens 20 has, a focus distance range (magnification) of the zoom lens, a focus distance, a shortest focus distance, an infinity distance, a luminance number, or the like. Further, the control unit 23 is configured to transmit information of the detection result of the operation detecting unit 27 to the body portion 10.

The body portion 10 configuring the photographing equipment 1 has the image pickup unit 12 which is configured with an image pickup device such as a CCD and a CMOS sensor. The image pickup unit 12 photoelectrically converts an object image from the interchangeable lens 20 provided at the front face of the body portion 10 to obtain a picked up image. The image pickup unit 12 is subjected to drive control by the signal processing and control unit 11 to output the picked up image. Note that it is also possible to employ an image pickup device in which pixels for focus detection (hereinafter, referred to as "AF pixels") other than the image pickup pixels (normal pixels) for configuring an image are configured as the image pickup device of the image pickup unit 12.

The signal processing and control unit 11 which is configured with, for example, a CPU, controls each unit of the photographing equipment 1. The signal processing and control unit 11 outputs a drive signal for the image pickup device to the image pickup unit 12 and reads out the picked up image from the image pickup unit 12. The signal processing and control unit 11 performs predetermined signal processing, for example, color adjustment processing, matrix conversion processing, noise removal processing and other various signal processings on the read picked up image. The output of the image pickup unit 12 may include a pixel signal from the AF pixels, in which case the signal processing and control unit 11 can perform calculation for focus control using the output of the AF pixels.

In the body portion 10, a clock unit 14 and an operation determining unit 15 are also arranged. The clock unit 14 generates time information to be used by the signal processing and control unit 11. The operation determining unit 15 is configured to generate an operation signal based on user operation performed on operating units including a release button (not shown), a function button, and various switches such as photographing mode setting provided at the body portion 10 and output the operation signal to the signal processing and control unit 11. The signal processing and control unit 11 controls each unit based on the operation signal.

The signal processing and control unit 11 can perform processing regarding recording and reproduction of the picked up image. For example, the signal processing and control unit 11 can perform compression processing on the picked up image after the signal processing and provide the compressed image to the recording unit 19 to record the image. It is possible to employ, for example, a card interface as the recording unit 19, and the recording unit 19 can record image information, speech information, or the like in a recording medium such as a memory card.

In the present embodiment, a failure database (DB) 19a which will be described later is recorded in the recording unit 19. Further, the recording unit 19 is configured to hold various determination results for obtaining a dissatisfaction factor which will be described later. Still further, information regarding operation assistance (operation assistance information) for solving a dissatisfaction factor is also recorded in the recording unit 19.

A display control unit 11a of the signal processing and control unit 11 carries out various processings regarding display. The display control unit 11a can provide the picked up image after the signal processing to the display unit 17 and an eyepiece display unit 18. The display unit 17 and the eyepiece display unit 18 which have display screens such as an LCD, display the image provided from the display control unit 11a. Further, the display control unit 11a is configured to be able to provide various menu displays, or the like on the display screens of the display unit 17 and the eyepiece display unit 18.

The signal processing and control unit 11 can read out the picked up image recorded in the recording unit 19 and perform decompression processing. The display control unit 11a provides the picked up image subjected to the decompression processing to the display unit 17 and the eyepiece display unit 18, thereby the recorded image can be reproduced.

As described later, the display unit 17 has a display screen 17b (see FIG. 19) which displays the picked up image. Further, a touch panel 17a is provided on the display screen 17b. The touch panel 17a can generate an operation signal according to a position on the display screen 17b designated by the finger of the user. The operation signal is supplied to the signal processing and control unit 11. By this means, when the user touches or slides the display screen 17b, the signal processing and control unit 11 can detect various type of operation such as a position where the user touches, operation that fingers which are touched are closed and separated (pinch operation), slide operation, a position reached by the slide operation, a slide direction, and a period during which the user touches, and can carry out processing corresponding to the user operation.

Note that because the display unit 17 is arranged so as to occupy substantially the whole area of, for example, a back side of the body portion 10, a photographer can confirm a through image displayed on the display screen 17b of the display unit 17 upon photographing, and can also perform photographing operation while confirming the through image.

The body portion 10 is provided with an object detecting unit 16. The object detecting unit 16 performs processing of detecting an object from the picked up image on the picked up image using a publicly-known method. For example, the object detecting unit 16 can detect a face of a human by sequentially comparing the picked up image with a plurality of gray-scale images in which characteristics of luminance of faces are modeled. Further, the object detecting unit 16 can detect the whole body of the human as well as the face of the human. Still further, the object detecting unit 16 can detect an object of a pet or a specific object or an area such as part thereof through, for example, pattern determination.

In the present embodiment, in order to assist the user to set a photographing parameter, the signal processing and control unit 11 is provided with a portion determining unit 11b, an image and setting analyzing unit (image analyzing unit) 11c, a search unit 11d and a photographing assisting unit 11e. Note that the image and setting analyzing unit (image analyzing unit) 11c may analyze only an image or analyze setting including a focus and exposure adjustment position which will affect the image and image quality, or setting of the photographing parameter.

The portion determining unit 11b determines a portion designated by the user in cooperation with the object detecting unit 16. For example, when the user designates a specific area or an object in the picked up image through touch operation, or the like on the touch panel 17a, the portion determining unit 11b determines an area of the object (hereinafter, referred to as an "inspection area") in the picked up image corresponding to the position where the user touches and outputs the determination result. Note that when the user designates an area by slide operation, or the like on the touch panel 17a, the portion determining unit 11b may determine the area as the inspection area.

The image and setting analyzing unit 11c and the search unit 11d estimate a factor of the picked up image which may be dissatisfied by the user (hereinafter, simply referred to as a "dissatisfaction factor"). The image and setting analyzing unit 11c analyzes the image and the setting in the inspection area determined by the portion determining unit 11b and obtains the analysis result. The search unit 11d obtains a dissatisfaction factor by searching a failure database (DB) based on the analysis result of the image and setting analyzing unit 11c. In the failure database (DB), a relationship between characteristics of the image and operation and setting of a camera which are replaced with factors upon photographing which may be logically related to the characteristics of the image is recorded in the recording unit based on a state and a position of the analyzed image according to information written during process of shipment of the camera and a result of communication performed by the camera through the network.

In the failure database 19a, four factors of exposure, color, focus and blur are set as dissatisfaction factors, and information regarding characteristics of the image for specifying these factors is stored. That is, the image and setting analyzing unit 11c obtains the characteristics of the image in the inspection area by analyzing the image and the setting, and the search unit 11d searches the failure database 19a based on the obtained characteristics of the image to thereby obtain a dissatisfaction factor which indicates what kind of defect the image has (defect which can be solved by user operation when the image is acquired). As described above, in the failure database (database), a relationship between characteristics of the image and operation and setting of a camera which are replaced with factors upon photographing which may be logically related to the characteristics of the image is recorded in the recording unit based on a state and a position of the analyzed image according to information written during process of shipment of the camera and a result of communication performed by the camera through the network. As the characteristics of the image, a level and balance as a result of photoelectric conversion, a difference between pixels and areas, or the like may be detected. These are difficult to be visually measured by the human, but can be easily measured through analysis of a signal within the camera. Of course, it is also possible to add advanced determination such as determination using resolution sensitivity and contrast to the factors. In this case, the factors include a compression rate, the number of effective pixels, pixel addition, or the like. Determination elements may include how to apply image processing such as contrast adjustment and gamma conversion depending on the setting of the camera. While experience and knowledge, and complicated judgment according to the situation are required to replace these characteristics of the image, the image quality, or the like with operation, the database is configured such that association between these characteristics and the operation using knowledge is held by the camera in advance and advice can be provided to the user in a comprehensible manner. While setting, operation and processing in the camera cannot be generally understood by the user who is a beginner, by replacing these with user operation, these setting, operation and processing in the camera can be easily understood, so that it is possible for the user to take the next action. It is very meaningful that the search unit performs search based on the characteristics of the image at the position designated by the user from the database and the photographing assistance unit which provides display of operation assistance based on operation assistance information for solving an inappropriate factor such as a failure obtained at the position is provided, which makes the equipment user-friendly.

Information of the estimated dissatisfaction factor is provided to the photographing assisting unit 11e. The photographing assisting unit 11e is configured to provide information for removing the dissatisfaction factor to the user according to the detected dissatisfaction factor. For example, the photographing assisting unit 11e may read out the information recorded in the recording unit 19 and provide the information to the display control unit 11a to thereby realize display of operation assistance for assisting appropriate operation for each dissatisfaction factor.

FIG. 2A and FIG. 2B are explanatory diagrams for explaining content of the failure DB 19a. FIG. 2A illustrates a database for partial determination, while FIG. 2B illustrates a database for whole determination. In FIG. 2A and FIG. 2B, image characteristics for determining a dissatisfaction factor are expressed with circles. Of course, it is also possible to add advanced determination such as determination using resolution sensitivity and contrast to the factors as characteristics of the image.

FIG. 2A and FIG. 2B are used to obtain exposure, color, focus and blur as dissatisfaction factors, and describe characteristics of the image to be determined which are divided into partial characteristics and characteristics of the whole image. Note that characteristics of the image include characteristics obtained by setting of the photographing parameter as well as characteristics obtained by analysis of the image. The circles in FIG. 2A and FIG. 2B indicate that which of the corresponding characteristics of the image lead to dissatisfaction factors as a result of the analysis. For example, concerning blur, FIG. 2A and FIG. 2B indicate that as a result of the analysis, when there is a defect in any one of a motion vector, contrast, image stabilization ON/OFF and shutter speed, a dissatisfaction factor of blur occurs. That is, it is possible to call attention to the user concerning this defect and solve the defect by performing operation again.

Detection of each dissatisfaction factor will be described below with reference to FIG. 3 to FIG. 16B. FIG. 3, FIG. 7, FIG. 11 and FIG. 14 are flowcharts for explaining a method for obtaining a dissatisfaction factor associated with an image pickup state, and FIG. 4A, FIG. 4B, FIG. 5, FIG. 6, FIG. 8A, FIG. 9A, FIG. 9B, FIG. 10A, FIG. 10B, FIG. 12A, FIG. 12B, FIG. 13A, FIG. 13B, FIG. 15A, FIG. 15B, FIG. 16A and FIG. 16B are explanatory diagrams thereof.

FIG. 3 is a flowchart in a case where dissatisfaction associated with color is detected. In step S1 in FIG. 3, the image and setting analyzing unit 11c determines whether or not any of RGB which are components of the picked up image is saturated in the inspection area and records the determination result in the recording unit 19 (step S2). Further, in step S3, the image and setting analyzing unit 11c determines whether or not any of RGB which are components of the picked up image is a level equal to or lower than a threshold in the inspection area and records the determination result in the recording unit 19 (step S4).

Figure 5:
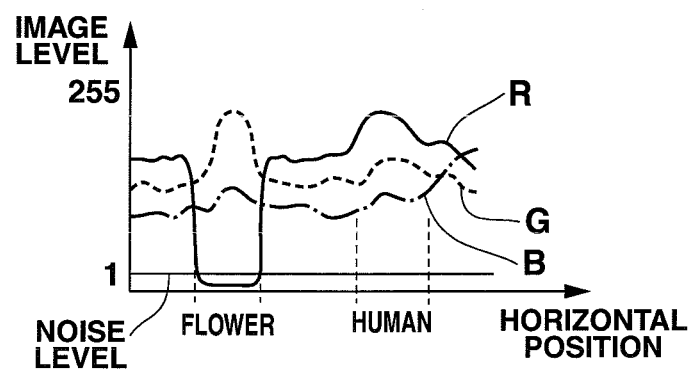
FIG. 5 is an explanatory diagram for explaining a method for obtaining a dissatisfaction factor associated with an image pickup state.

FIG. 4A, FIG. 4B and FIG. 5 are diagrams for explaining image analysis regarding dissatisfaction associated with color performed by the image and setting analyzing unit 11c. FIG. 4A illustrates a picked up image 31 in which an image of a flower 32 and an image of a human 33 are picked up. The picked up image 31 is displayed as a through image on the display screen 17b of the display unit 17. FIG. 4B illustrates a graph indicating a level of RGB components of each pixel on a horizontal line A, in which the horizontal axis indicates a position corresponding to the horizontal position of the picked up image 31 and the vertical axis indicates an image level on the horizontal line A in the picked up image 31.

In the example of FIG. 4B, the image level takes stepwise levels from 0 to 255. The example of FIG. 4B indicates that a level of the R component is saturated in a portion of the image of the flower 32 in the picked up image 31. When detecting a state of FIG. 4B, the image and setting analyzing unit 11c records a determination result that a defect occurs due to saturation of the image level.

Further, FIG. 5 illustrates that by way of a display method similar to that in FIG. 4B, the level of the R component is deficient at the portion of the image of the flower 32 in the picked up image 31 and the image level becomes a noise level. When detecting a state of FIG. 5, the image and setting analyzing unit 11c records a determination result that a defect occurs due to deficiency of any of the RGB components. A noise level allowable by the user may vary, and, for example, it is also possible to set a threshold of 1/100 of the saturation level and determine whether the image level is lower than the threshold. This can be also included as characteristics of the image or characteristics of a pixel signal.

In subsequent step S5, the image and setting analyzing unit 11c detects whether or not current color temperature setting relatively greatly differs from an optimal color temperature which is automatically set. The setting of the color temperature affects the whole image. The image and setting analyzing unit 11c, for example, determines whether or not a difference between the current color temperature setting set by the user and the optimal color temperature setting obtained by automatic setting exceeds a predetermined threshold and records the determination result in the recording unit 19 (step S6).

Figure 6:
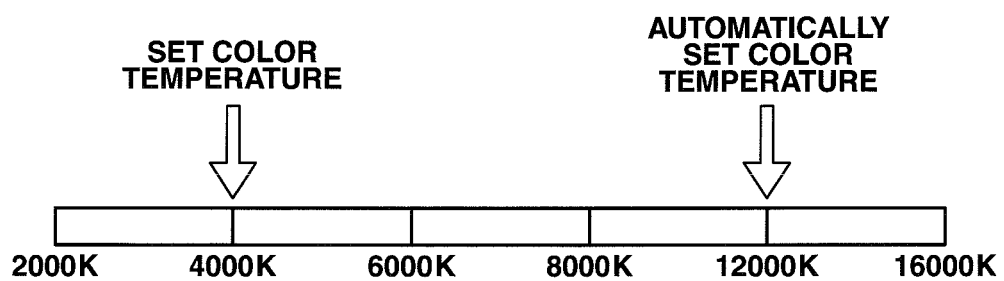
FIG. 6 is an explanatory diagram for explaining a method for obtaining a dissatisfaction factor associated with an image pickup state.

FIG. 6 is an explanatory diagram for explaining color temperature setting. Arrows in FIG. 6 indicate a current color temperature set value (set color temperature) and an optimal color temperature by automatic setting (automatically set color temperature). The example of FIG. 6 indicates that the set color temperature set by the user is 4000K and the automatically set color temperature is 12000K, in which case, the image and setting analyzing unit 11c determines that a defect occurs because the color temperature setting is greatly deviated from the optimal color temperature setting, and records the determination result. These defects can be improved by changing the setting upon observation and photographing.

Figure 7:
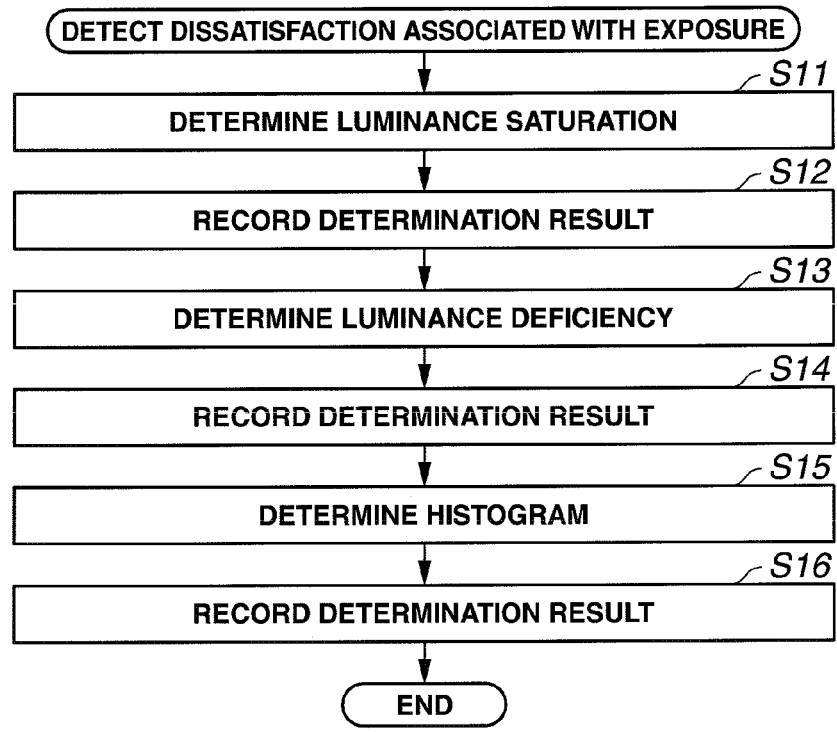
FIG. 7 is a flowchart for explaining a method for obtaining a dissatisfaction factor associated with an image pickup state.

FIG. 7 is a flowchart in a case where dissatisfaction associated with exposure is detected. In step S11 of FIG. 7, the image and setting analyzing unit 11c determines whether or not a luminance value in the inspection area of the picked up image is saturated and records the determination result in the recording unit 19 (step S12). Further, in step S13, the image and setting analyzing unit 11c determines whether or not the luminance value in the inspection area of the picked up image is a level equal to or lower than a threshold and records the determination result in the recording unit 19 (step S14).

Figure 8A:
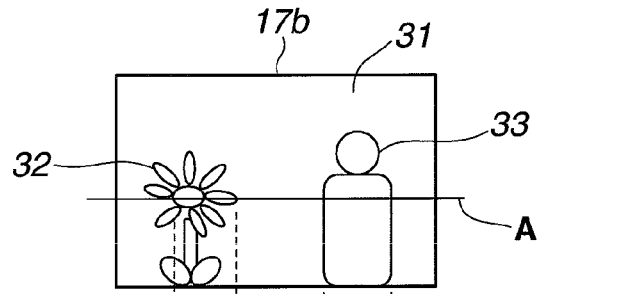
FIG. 8A and FIG. 8B are explanatory diagrams for explaining a method for obtaining a dissatisfaction factor associated with an image pickup state.
Figure 8B:
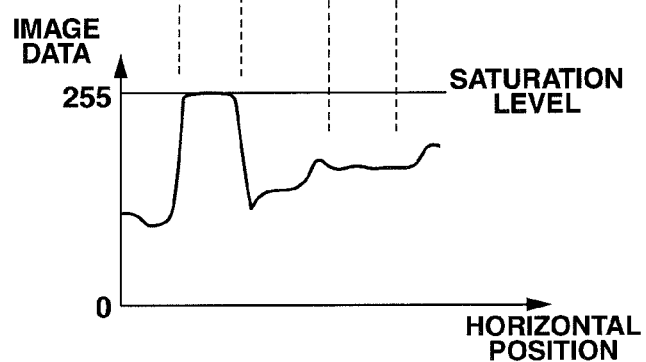

FIG. 8A, FIG. 8B, FIG. 9A and FIG. 9B are diagrams for explaining image analysis regarding dissatisfaction associated with exposure performed by the image and setting analyzing unit 11c. FIG. 8A and FIG. 9A illustrate the same picked up image 31 as that in FIG. 4A, and FIG. 8B and FIG. 9B illustrate a graph indicating a luminance level of each pixel on a horizontal line A, in which the horizontal axis indicates a position corresponding to the horizontal position of the picked up image 31 and the vertical axis indicates an image level on the horizontal line A in the picked up image 31.

In the example of FIG. 8B, the image level takes stepwise levels from 0 to 255. The example of FIG. 8B indicates that the luminance level is saturated in a portion of the image of the flower 32 in the picked up image 31. When detecting a state of FIG. 8B, the image and setting analyzing unit 11c records a determination result that a defect occurs due to too much exposure in the inspection area.

Further, the example of FIG. 9B indicates that the luminance level is deficient in a portion of the image of the flower 32 in the picked up image 31. When detecting a state of FIG. 9B, the image and setting analyzing unit 11c records a determination result that a defect occurs due to too little exposure in the inspection area.

In subsequent step S15, the image and setting analyzing unit 11c performs histogram determination and records the determination result in the recording unit 19 (step S16). The histogram indicates luminance distribution of the whole image, and the image and setting analyzing unit 11c, for example, determines whether or not there is bias in the histogram.

FIG. 10A and FIG. 10B are explanatory diagrams for explaining luminance determination of the whole image using the histogram in which the horizontal axis indicates luminance values of stages from 0 to 255 and the vertical axis indicates the number of pixels to indicate the histogram. FIG. 10A indicates that the image is wholly too dark, while FIG. 10B indicates that the image is wholly too bright, and in these cases, a determination result indicating a defect is recorded. The balance of the color temperature and the distribution of the histogram can be included in the characteristics of the image. Further, because the component 11c not only examines only the image quality (characteristics of the image) but also analyzes a difference in a setting point, a point where control is performed and a point where the user cares, this component 11c is described as the image and setting analyzing unit instead of being merely described as an image analyzing unit. For example, when control is performed to adjust exposure in the center of the screen, there may be a case where it is determined that exposure is not adjusted in a part other than the center of the screen. Because such determination is advantageously simple and is not incorrect, it is meaningful to notify the user. Of course, there is also a method for determining characteristics of the image in which characteristics are determined as to whether a portion is a portion of a face or a portion other than the face for a camera which determines that there is a face within the screen and adjusts exposure and color for the face.

FIG. 11 is a flowchart in a case where dissatisfaction associated with focus is detected. In step S21 of FIG. 11, the image and setting analyzing unit 11c determines whether or not contrast is lower than a predetermined threshold by comparing the inspection area with an area around the inspection area and records the determination result in the recording unit 19 (step S22). Further, in step S23, the image and setting analyzing unit 11c determines whether or not distance between two images which is a defocus amount obtained using a phase-contrast method is larger than a predetermined threshold in the inspection area and records the determination result in the recording unit 19 (step S24).

Figure 13A:
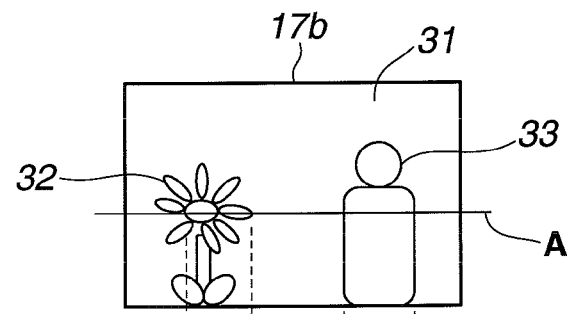
FIG. 13A and FIG. 13B are explanatory diagrams for explaining a method for obtaining a dissatisfaction factor associated with an image pickup state.
Figure 13B:
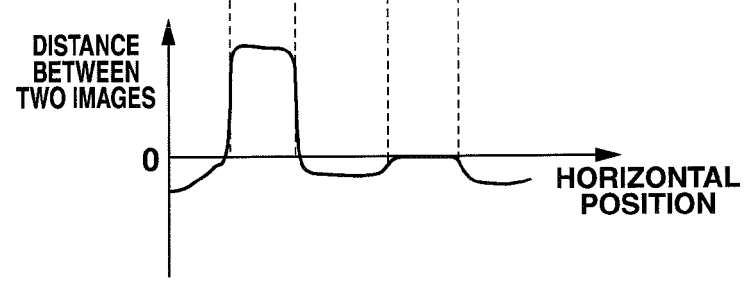

FIG. 12A, FIG. 12B, FIG. 13A and FIG. 13B are diagrams for explaining image analysis regarding dissatisfaction associated with focus performed by the image and setting analyzing unit 11c. FIG. 12A and FIG. 13A illustrate the same picked up image 31 as that in FIG. 4A. FIG. 12B illustrates a graph indicating change of contrast on a horizontal line A, in which the horizontal axis indicates a position corresponding to a horizontal position of the picked up image 31 and the vertical axis indicates a contrast value on the horizontal line A in the picked up image 31, while FIG. 13B illustrates a graph indicating change of defocus on the horizontal line A, in which the horizontal axis indicates a position corresponding to a horizontal position of the picked up image 31 and the vertical axis indicates distance between two images on the horizontal line A in the picked up image 31.

The example of FIG. 12B indicates that the contrast is lower than the threshold in the portion of the image of the flower 32 in the picked up image 31. When detecting a state of FIG. 12B, the image and setting analyzing unit 11c records a determination result that a defect occurs due to low contrast and defocus in the inspection area.

Further, the example of FIG. 13B indicates defocus in the portion of the image of the flower 32 in the picked up image 31. When detecting a state of FIG. 13B, the image and setting analyzing unit 11c records a determination result that a defect occurs due to defocus in the inspection area.

In subsequent step S25, the image and setting analyzing unit 11c determines a difference from a focus set value set by auto focus and records the determination result in the recording unit 19 (step S26). The image and setting analyzing unit 11c determines whether or not a difference between a current focus amount and the auto focus set value is larger than a predetermined threshold, and, when the difference is larger than the predetermined threshold, records the determination result that a defect occurs due to defocus of the whole image in the recording unit 19 (step S26). It is also possible to use a difference in distance for focus, a difference in a position where the focus lens stops or a phase difference upon phase difference AF as the focus amount. Further, while this value may vary as appropriate according to property and diaphragm of the lens and an object, it is also possible to utilize a value obtained by switching predefined values while taking into account the variation or allow the user to set the value. Further, it is also possible to take into account a difference between a focus point in the screen and a determination point and a difference regarding setting. Because the image and setting analyzing unit 11c not only examines only the image quality but also analyzes a difference in the setting point, the point where control is performed and the point where the user cares as described above, the image and setting analyzing unit 11c is described as the image and setting analyzing unit instead of being merely described as an image analyzing unit. For example, when control is performed to adjust the focus in the center of the screen, because it is easily determined that focus is not adjusted around the center of the screen, and such determination is simple and can be regarded as one way for determination which is not incorrect, it is meaningful to notify the user. In this case, it is also possible to determine a difference in position with a focused position as characteristics of the image. Of course, there is also a method for determining characteristics of the image in which it is determined whether there is a face in the screen and whether a portion is a portion of the face or a portion other than the face.

FIG. 14 illustrates a flowchart in a case where dissatisfaction associated with blur is detected. In step S31 of FIG. 14, the image and setting analyzing unit 11c determines whether or not a shutter speed is longer than a predetermined threshold and records the determination result in the recording unit 19 (step S32). Further, in step S33, the image and setting analyzing unit 11c determines whether an image stabilization function is turned off and records the determination result in the recording unit 19 (step S34).

Further, in step S35, the image and setting analyzing unit 11c determines whether or not a motion vector in the inspection area is larger than a predetermined threshold and records the determination result in the recording unit 19 (step S36). Still further, in step S37, the image and setting analyzing unit 11c determines whether or not an average motion vector for the whole image is larger than a predetermined threshold and records the determination result in the recording unit 19 (step S38).

Figure 15A:
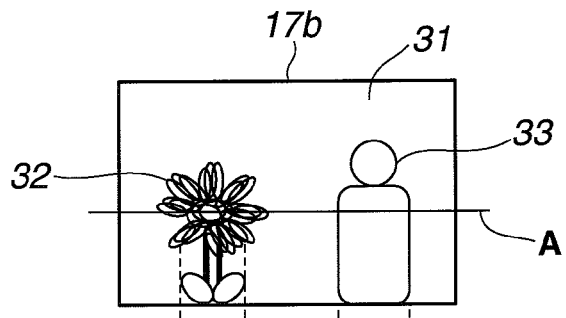
FIG. 15A and FIG. 15B are explanatory diagrams for explaining a method for obtaining a dissatisfaction factor associated with an image pickup state.
Figure 15B:
Figure 16A:
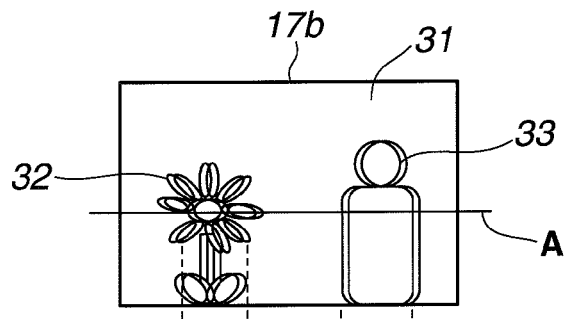
FIG. 16A and FIG. 16B are explanatory diagrams for explaining a method for obtaining a dissatisfaction factor associated with an image pickup state.
Figure 16B:
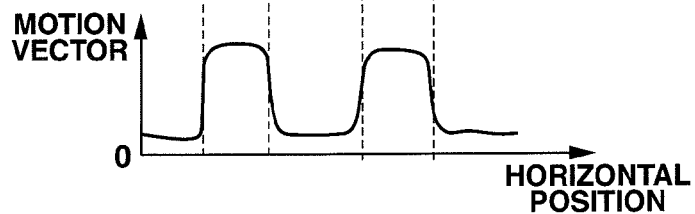

FIG. 15A, FIG. 15B, FIG. 16A and FIG. 16B are diagrams for explaining image analysis regarding dissatisfaction associated with blur performed by the image and setting analyzing unit 11c. FIG. 15A and FIG. 16A illustrate the same picked up image 31 as that in FIG. 4A, and FIG. 15B and FIG. 16B are graphs indicating change of a motion vector on a horizontal line A, in which the horizontal axis indicates a position corresponding to a horizontal position of the picked up image 31 and the vertical axis indicates an image level on the horizontal line A in the picked up image 31.

The example of FIG. 15B indicates that the motion vector becomes larger than a threshold in a portion of the image of the flower 32 in the picked up image 31. When detecting a state of FIG. 15B, the image and setting analyzing unit 11c records a determination result that the image includes blur due to a large motion vector in the inspection area.

Further, the example of FIG. 16B indicates that the motion vector becomes larger than the threshold in the portion of the image of the flower 32 and a portion of the image of the human 33 in the picked up image 31. When detecting a state of FIG. 16B, the image and setting analyzing unit 11c records a determination result that the image includes blur due to a large motion vector in the whole image. This motion vector is not required to be exact as used in video shooting, and a value utilizing a difference or change in contrast between two images (frames) may be used. Further, while an image moves in the screen when an exposure period is long, it is also possible to analyze whether the image moves in a predetermined direction from characteristics of distribution. For example, when contrast is increased by expansion or contraction in a certain direction, it can be regarded as blur, which can be analyzed as characteristics of the image. This analysis can be regarded as analysis in a direction of change of the image in the screen. Particularly, if the blur exists uniformly over the image, this blur is not object blur due to movement of a target, but is highly likely to be due to camera shake which the user should be careful about. Of course, it is also possible to determine these separately. Further, while this value can vary appropriately according to the object or photographing conditions, it is also possible to switch predefined values which are set taken into account the object or the photographing conditions or allow the user to set the value. For example, it is also possible to perform determination by confirming whether or not a contrast position is shifted by several pixels as a threshold. As there is a way of photographing such as panning in which a background is purposely blurred, judgment may be performed according to a position in the screen and a photographing method (which are determined using acceleration applied to the equipment), background determination, determination of a main object, or the like. These can be included in the characteristics of the image or characteristics between images. Of course, for a camera which determines that there is a face in the screen and controls photographing for the face, there is a method for determining characteristics of the image in which a portion of the face is detected and a portion other than the face is set as a background.

Note that while an example where the motion vector is used to detect blur of the whole image is described in step S37, it is also possible to utilize other methods, for example, contrast determination. For example, when an image having blur in a horizontal direction is compressed in one horizontal direction, contrast of a portion of the image may be increased. By compressing the image in one horizontal direction by utilizing this method, it is possible to detect blur in the whole image.

Figure 17:
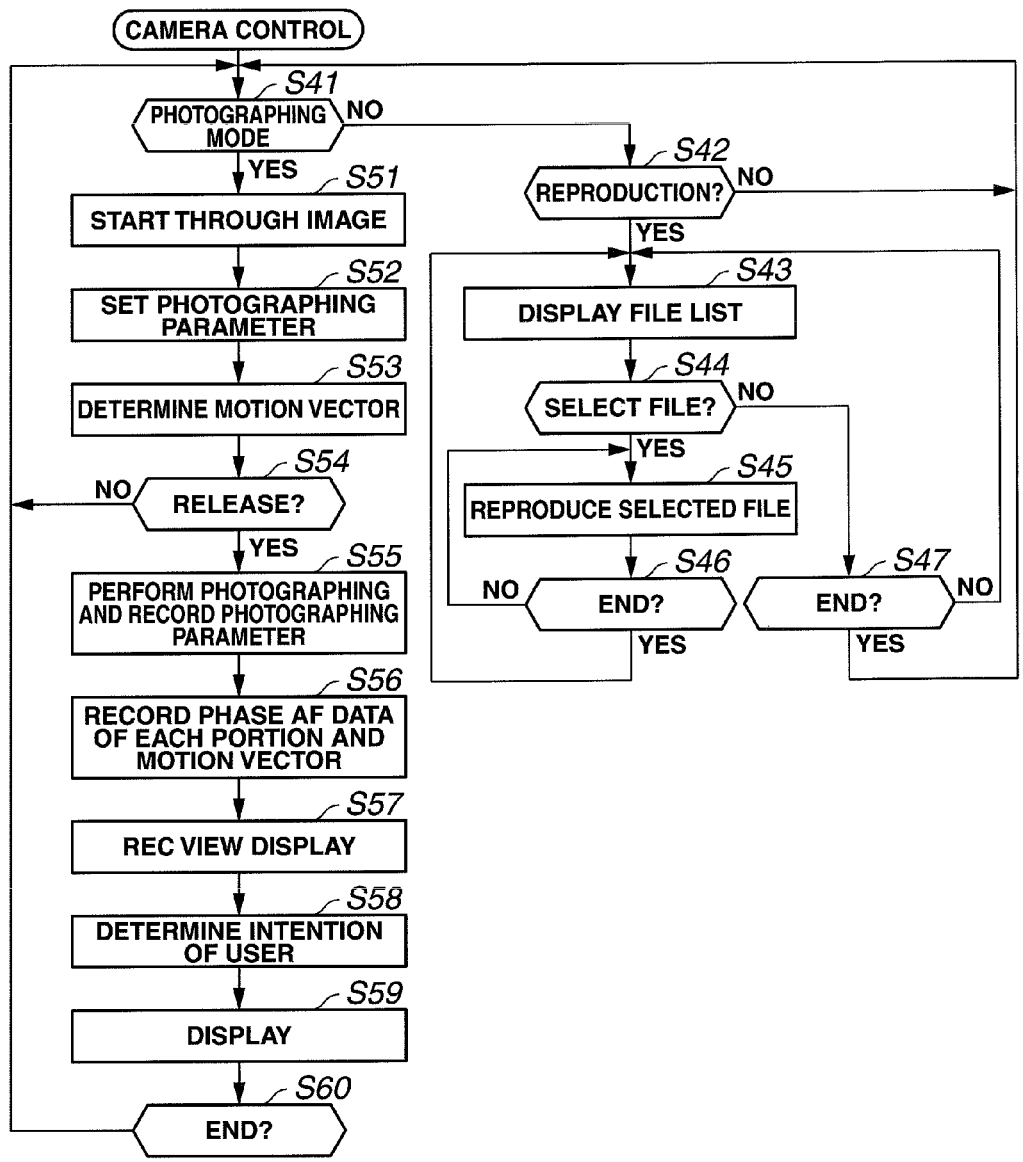
FIG. 17 is a flowchart for explaining camera control.
Figure 18:
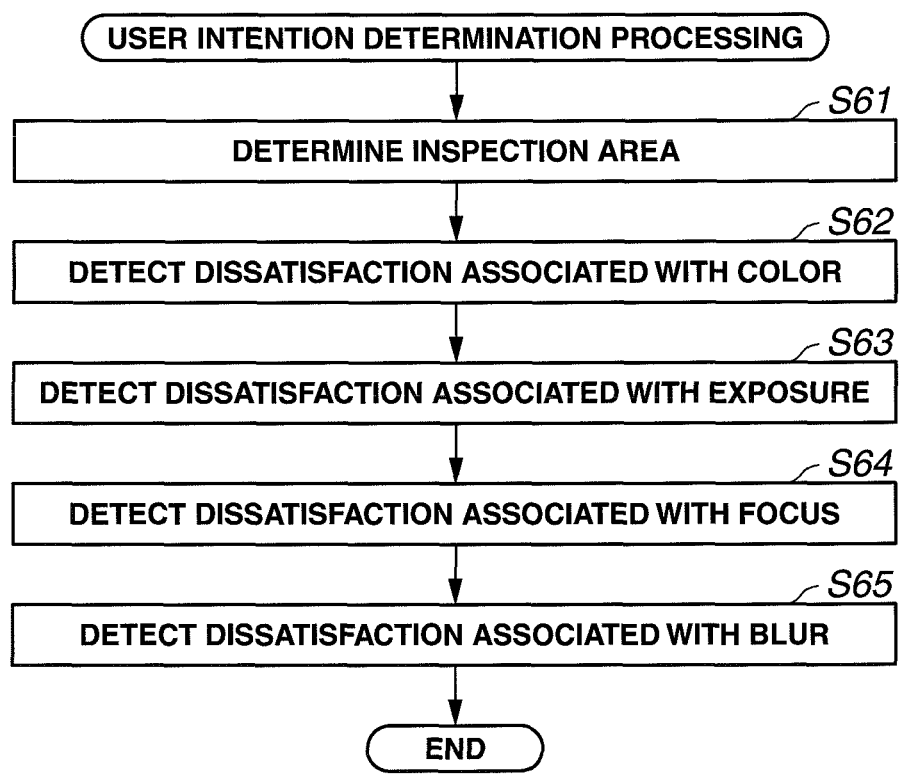
FIG. 18 is a flowchart specifically illustrating intention determination processing in FIG. 17.
Figure 19:
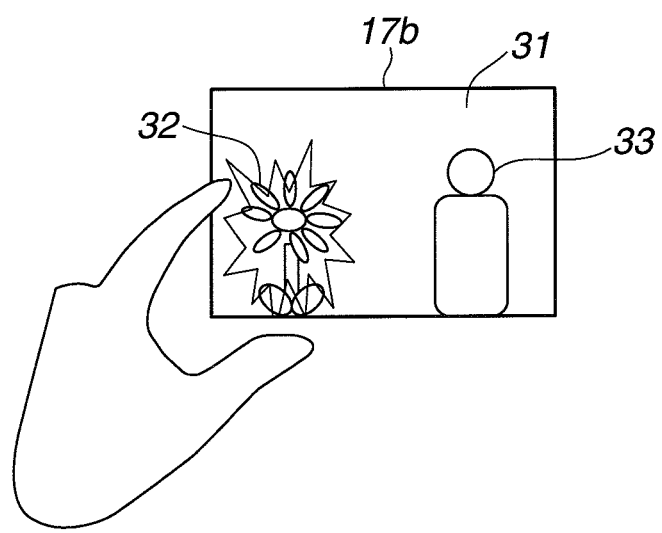
FIG. 19 is an explanatory diagram for explaining designation of an inspection area by a user.

The operation of the embodiment configured as described above will be described with reference to FIG. 17 to FIG. 20E. FIG. 17 is a flowchart for explaining camera control, and FIG. 18 is a flowchart specifically indicating intention determination processing in FIG. 17. Further, FIG. 19 is an explanatory diagram for explaining designation of an inspection area by the user.

When the photographing equipment 1 is powered on, in step S41 in FIG. 17, the signal processing and control unit 11 determines whether or not a photographing mode is indicated. When the photographing mode is not indicated, the signal processing and control unit 11 determines whether or not a reproduction mode is indicated in step S42. When the reproduction mode is indicated, the signal processing and control unit 11 displays a list of thumbnails in step S43. When the user who refers to the list of thumbnails selects an image, the process shifts to the processing from step S44 to step S45, where the signal processing and control unit 11 reproduces the selected image. When the reproduction is finished (step S46), display of a list of files is repeated. When a file is not selected, it is determined in step S47 that the reproduction mode is finished.

In contrast, when the photographing mode is indicated, the signal processing and control unit 11 displays the picked up image (through image) as live view at the display unit 17 based on an image signal from the image pickup unit 12 in step S51. The signal processing and control unit 11 sets various photographing parameters in step S52 and determines a motion vector from the picked up image in step S53.

In step S54, it is determined whether or not photographing operation is performed. For example, when photographing of a still image is instructed through operation of a release button, or the like, the signal processing and control unit 11 performs photographing in step S55. That is, the signal processing and control unit 11 performs signal processing on the picked up image from the image pickup unit 12 to compress the picked up image, and then provides the picked up image to the recording unit 19 to record the picked up image. Further, in step S55, a photographing parameter is also recorded in the recording unit 19 at the same time as photographing. Still further, phase AF data (distance between two images) and the motion vector of each unit are also recorded by the image and setting analyzing unit 11c (step S56). The signal processing and control unit 11 then provides the recorded picked up image to the display unit 17 to display the picked up image as rec view (step S57).

In the present embodiment, in subsequent step S58, user intention is determined. FIG. 18 illustrates an example of intention determination processing in FIG. 17. First, in step S61, the portion determining unit 11b determines an inspection area.

FIG. 19 illustrates the picked up image 31 displayed as rec view on the display screen 17b. The picked up image 31 includes the image of the flower 32 and the image of the human 33. It is now assumed that the user is dissatisfied with a photographed result of the image of the flower 32. The user knows neither a cause of the dissatisfaction nor its solution. In this case, in the present embodiment, by the user designating a portion of the image where the user is dissatisfied with the photographed result, it is possible to present a cause of the dissatisfaction and its solution. Note that the user may designate the whole image as the portion of the image which the user is dissatisfied with.

For example, the user touches the portion of the image which the user is dissatisfied with in the picked up image 31. For example, as illustrated in FIG. 19, the user touches a portion of the image of the flower 32. The portion determining unit 11b detects that the user is dissatisfied with the photographed result of the image of the flower 32 through the touch operation of the user and the detection result of the object detecting unit 16, and sets the portion of the image of the flower as the inspection area.

The image and setting analyzing unit (which may be referred to as an image analyzing unit or an image characteristic analyzing unit) 11c sequentially performs detection of dissatisfaction associated with color (step S62), detection of dissatisfaction associated with exposure (step S63), detection of dissatisfaction associated with focus (step S64) and detection of dissatisfaction associated with blur (step S65). As the processing from step S62 to step S65, flows illustrated in, for example, FIG. 3, FIG. 7, FIG. 11 and FIG. 14 are employed.

The search unit 11d searches the failure database 19a using the detection result of the dissatisfaction detection processing in step S62 to step S65 to estimate a dissatisfaction factor. For example, in the example of the failure database 19a illustrated in FIG. 2A and FIG. 2B, it is estimated that when the luminance level is saturated or deficient in the inspection area or there is bias in the histogram of the whole image, the factor of the user's dissatisfaction is due to a defect of exposure. Note that there is not always one dissatisfaction factor. It is preferable that these dissatisfaction factors can be improved and solved through user operation upon photographing and observation.

The photographing assisting unit 11e provides information for removing the dissatisfaction factor to the user according to the dissatisfaction factor searched by the search unit 11d. For example, the photographing assisting unit 11e controls the display control unit 11a to display operation assistance for assisting operation for obtaining an appropriate image.

Figure 20A:
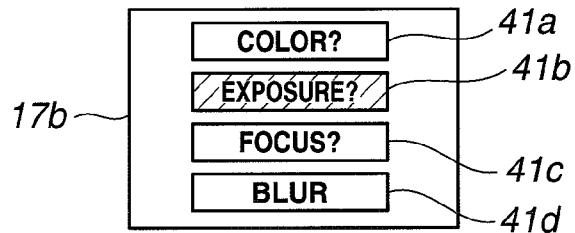
FIG. 20A to FIG. 20E are explanatory diagrams illustrating display of operation assistance.

FIG. 20A to FIG. 20E are explanatory diagrams illustrating display of operation assistance in this case. FIG. 20A illustrates display of dissatisfaction factors. The photographing assisting unit 11e displays dissatisfaction factors on the display screen 17b of the display unit 17. In the example of FIG. 20A, which of color, exposure, focus and blur which can be considered as dissatisfaction factors is detected as the dissatisfaction factor is indicated by a difference in color of display, or the like of factor display units (factor icons) 41a to 41d. The example of FIG. 20A indicates that the exposure is detected as the dissatisfaction factor by a difference in color expressed with diagonal lines.

Figure 20B:
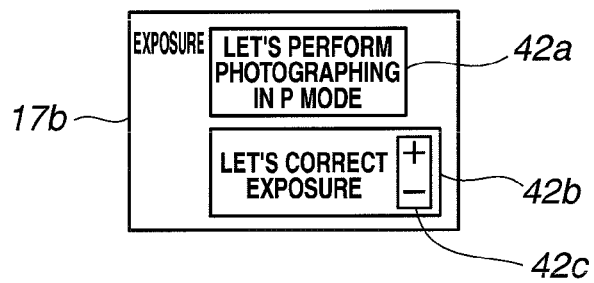

If the user wishes to know the operation to solve the dissatisfaction factor, the user touches the factor display unit 41b which indicates the dissatisfaction factor to be solved. By this means, the photographing assisting unit 11e displays details of operation assistance (assistance icons) 42a and 42b illustrated in FIG. 20B. FIG. 20B illustrates display associated with exposure, and display of the details of the operation assistance (assistance icon) 42a encourages the user to perform photographing in a program (P) mode, while display of the details of the operation assistance (assistance icon) 42b encourages the user to correct exposure.

Note that in the program mode, the signal processing and control unit 11 automatically sets, for example, ISO, a shutter speed, diaphragm, or the like. When the user touches the display 42a, the signal processing and control unit 11 sets the program mode.

Further, the display of the details of the operation assistance 42b includes a button display 42c for correcting exposure, and when the user touches "+" mark or "−" mark of the button display 42c, the signal processing and control unit 11 changes the exposure in a positive direction or in a negative direction.

As described above, even when the user knows neither the cause of the dissatisfaction regarding the picked up image nor its solution, by touching the portion of the image which the user is dissatisfied with, it is possible to display the dissatisfaction factor and further present a setting method for solving the dissatisfaction, so that it is possible to simplify the operation for solving the dissatisfaction. The user does not have to learn complicated functions of the photographing equipment or a method for operating menu for implementing the functions, or the like, and can perform desired photographing relatively easily.

Figure 20C:
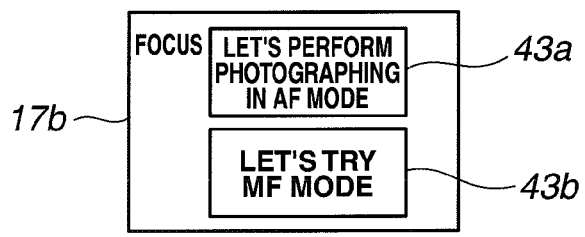

Note that FIG. 20C illustrates display associated with focus. Display of details of operation assistance (assistance icon) 43a encourages the user to perform photographing in an auto focus (AF) mode, while display of details of operation assistance (assistance icon) 43b encourages the user to perform photographing in a manual focus (MF) mode.

Figure 20D:
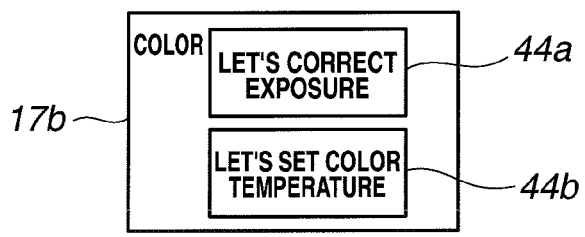
Figure 20E:
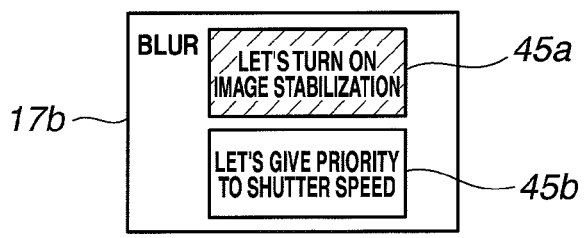

Further, FIG. 20D illustrates display associated with color. Display of details of operation assistance (assistance icon) 44a encourages the user to correct exposure, while display of details of operation assistance (assistance icon) 44b encourages the user to set a color temperature. Still further, FIG. 20E illustrates display associated with blur. Display of details of operation assistance (assistance icon) 45a encourages the user to activate an image stabilization function, while display of details of operation assistance (assistance icon) 45b encourages the user to perform setting so as to give priority in the shutter speed. Note that in FIG. 20E, for example, a gray portion expressed by the diagonal lines indicates that the image stabilization function has already been turned on, and the user cannot select the image stabilization function.

When the user touches the displays of the details of the operation assistance (assistance icons) 43a to 45a and 43b to 45b, the signal processing and control unit 11 shifts to a state where setting of a corresponding mode, or the like is possible. When the user purposely performs this setting, it is also possible to enable refusal or cancellation of the instruction by flicking fingers at the icon. Further, if the user is used to the operation, because there is a case where the assistance icon makes the screen difficult to be seen and bothers the user, it is important to enable refusal or cancellation of the instruction. It is also possible to prevent the icons which are frequently flicked from appearing and make them appear through switch operation only when they are needed.

In this way, in the present embodiment, the characteristics and the setting of the image are analyzed for the inspection area designated by the user using the failure database for specifying a dissatisfaction factor which may be dissatisfied with the user and the failure database is searched, so that the dissatisfaction factor is automatically detected. By this means, the user can reliably recognize the factor that the user feels dissatisfied with the image. Further, through the display of the operation assistance for solving the dissatisfaction factor, it is possible to present an operation method for obtaining an image desired by the user and perform photographing for obtaining a desired picked up image with a simple operation. The result searched in the failure database may be graphically illustrated or may support each language.

Because in advanced photographing equipment, there are a relatively large number of photographing parameters and various causes exert influence, it is difficult for a general user to understand a reason or solution for a failure of the photographed image, the user can easily recognize correct operation for obtaining a desired image by employing the present embodiment.

Further, while a digital camera is used as equipment for photographing to explain each embodiment of the present invention, it is of course possible to use digital single-lens reflex cameras or compact digital cameras, or cameras for movie such as video cameras and movie cameras, or further cameras embedded in personal digital assistants (PDAs) such as mobile phones and smart phones as the camera. Further, it is also possible to use industrial or medical optical equipment such as endoscopes and microscopes. While the equipment is not photographing equipment, it is possible to provide observation apparatuses and display apparatuses which can realize correct observation of an image desired by the user through these equipment. For example, when the present invention is applied to application for providing an advice for improving visualization in an observation apparatus, the failure database may record display information for displaying an operation guide of the observation apparatus.

For equipment which handles information such as an image, distributed in at least two dimensions, setting of the inspection area through screen designation operation and position designation operation through touch operation is very important for the user. Of course, it is possible to use cursor operation other than touch determination as a substitute for the touch determination. Further, also for display equipment for determining a failure of photographing, which are not photographing equipment, a technique for determining the characteristics of the image and providing suggestion, a message or an advice for next photographing to the user is important. In this case, the database does not have to be located inside the equipment, but may be configured to be able to search information inside an external server over a network. In this case, databases may be provided for each type of cameras or for each type of smart phones. An image file to be analyzed can include setting information regarding a control target position of focus and exposure as the characteristics of the image as long as the file includes setting information of the camera. The characteristics of the image include a signal level, balance or distribution of a signal, a pattern change direction in the screen, a pixel-based temporal difference, and the like.

The present invention is not directly limited to the above-described embodiments, but can be embodied in an implementation phase by modifying the components without deviating from the gist of the present invention. Further, various inventions can be made by appropriately combining a plurality of components described in the above embodiments. For example, some components among the all components described in the embodiments may be deleted. Further, components over different embodiments may be combined as appropriate.

Note that in operation flows in the claims, the specification and the drawings, while terms such as "first" and "next" are used for convenience sake, these terms are not used to mean that steps must be performed in this order. Further, it goes without saying that a portion not affecting the essence of the invention in respective steps which configure these operation flows can be omitted as appropriate.

Further, among the techniques described in the specification, most of the control or functions described mainly using the flowcharts can be set using a program, and the above-described control and functions can be implemented by a computer reading and executing the program. The whole or part of the program can be recorded or stored as a computer program product in portable media such as nonvolatile memories such as flexible disks and CD-ROMs or storage media such as hard disks and volatile memories and can be distributed or provided through shipment of the product, or the portable media or via a communication line. The photographing equipment of the present embodiment can be easily realized by a user downloading the program via a communication network and installing the program to the computer or installing the program to the computer from a recording medium.

What is claimed is:

1. Photographing apparatus comprising:
    an image pickup unit for picking up an image of an object to obtain a picked up image;
    a display unit for displaying the picked up image;
    a touch panel provided over the display unit for receiving user touch input associated with user dissatisfaction of the picked up image or a portion of the picked up image; and
    an a signal processing and control unit for
        (1) determining at least one dissatisfaction factor associated with the picked up image or the portion of the picked up image,
        (2) causing the display unit to display, for each of the determined at least one dissatisfaction factor, a corresponding touchable dissatisfaction factor area,
        (3) receiving an indication that the user touched one of the at least one touchable dissatisfaction factor areas,
        (4) responsive to receiving the indication that the user touched of one of the at least one touchable dissatisfaction factor areas, causing the display unit to display a touchable operation assistance area to correct the dissatisfaction factor associated with the touched one of the at least one touchable dissatisfaction factor areas,
        (5) receiving an indication that the user touched the touchable operation assistance area, and
        (6) responsive to receiving the indication that the user touched the touchable operation assistance area, setting a parameter of the photographing apparatus to correct the dissatisfaction factor associated with the touched one of the at least one touchable dissatisfaction factor areas,
    wherein the signal processing and control unit determines at least one dissatisfaction factor associated with the picked up image or the portion of the picked up image by
        determining an area in the picked up image corresponding to a position where the user touches to define an inspection area,
        analyzing at least one of (A) the picked up image in the inspection area and (B) settings of the photographing apparatus, to obtain an analysis result, and
        searching a database using the analysis result to obtain the at least one dissatisfaction factor, and
    wherein the analysis result includes characteristics of the picked up image selected from a group of characteristics consisting of (A) a level and balance as a result of photoelectric conversion, (B) a difference between pixels and areas, (C) resolution sensitivity (D) contrast to a compression rate, (E) contrast to a number of effective pixels, and (F) contrast to pixel addition.

2. The photographing apparatus of claim 1 wherein the analysis result includes characteristics of the picked up image obtained by setting of at least one photography parameter used when obtaining the picked up image.

3. The photographing apparatus of claim 1 wherein the analysis result includes characteristics of the picked up image obtained by analysis of the portion of the picked up image.

4. The photographing apparatus of claim 1 wherein for each of the determined at least one dissatisfaction factor, the corresponding touchable dissatisfaction factor area is an icon button.

5. The photographing apparatus of claim 1 wherein when the signal processing and control unit causes the display unit to display a touchable operation assistance area to correct the dissatisfaction factor associated with the touched one of the touchable dissatisfaction factor areas, the display of the at least one touchable dissatisfaction factor area corresponding to the determined at least one dissatisfaction factor is on the display unit is stopped.

6. A touch panel display system for use with a photographing apparatus including an image pickup unit for picking up an image of an object to obtain a picked up image, the touch panel display system comprising:
    a display unit for displaying the picked up image;
    a touch panel provided over the display unit for receiving user touch input associated with user dissatisfaction of the picked up image or a portion of the picked up image,
    wherein the display unit displays, for each of at least one dissatisfaction factor associated with the picked up image or the portion of the picked up image, a corresponding touchable dissatisfaction factor area,
    wherein the touch panel receives a user touch of one of the at least one touchable dissatisfaction factor areas,
    wherein, responsive to receiving the user touch of one of the at least one touchable dissatisfaction factor areas, the display unit displays a touchable operation assistance area to correct the dissatisfaction factor associated with the touched one of the at least one touchable dissatisfaction factor areas,
    wherein the touch panel receives a user touch of the touchable operation assistance area, which is used to trigger the transmission of an instruction for setting a parameter of the photographing apparatus to correct the dissatisfaction factor associated with the touched one of the at least one touchable dissatisfaction factor areas, wherein the at least one dissatisfaction factor associated with the picked up image or the portion of the picked up image was determined by
    determining an area in the picked up image corresponding to a position where the user touches to define an inspection area,
    analyzing at least one of (A) the picked up image in the inspection area and (B) settings of the photographing apparatus, to obtain an analysis result, and
    searching a database using the analysis result to obtain the at least one dissatisfaction factor, and
wherein the analysis result includes characteristics of the picked up image selected from a group of characteristics consisting of (A) a level and balance as a result of photoelectric conversion, (B) a difference between pixels and areas, (C) resolution sensitivity (D) contrast to a compression rate, (E) contrast to a number of effective pixels, and (F) contrast to pixel addition.

7. A method for controlling photographing apparatus including an image pickup unit for picking up an image of an object to obtain a picked up image, a display unit for displaying the picked up image, and a touch panel provided over the display unit for receiving user touch input associated with user dissatisfaction of the picked up image or a portion of the picked up image, the method comprising:
    determining at least one dissatisfaction factor associated with the picked up image or the portion of the picked up image;
    causing the display unit to display, for each of the determined at least one dissatisfaction factors, a corresponding touchable dissatisfaction factor area;
    receiving an indication that the user touched one of the at least one touchable dissatisfaction factor areas;
    responsive to receiving the indication that the user touched of one of the at least one touchable dissatisfaction factor areas, causing the display unit to display a touchable operation assistance area to correct the dissatisfaction factor associated with the touched one of the at least one touchable dissatisfaction factor areas;
    receiving an indication that the user touched the touchable operation assistance area; and
    responsive to receiving the indication that the user touched the touchable operation assistance area, setting a parameter of the photographing apparatus to correct the dissatisfaction factor associated with the touched one of the at least one touchable dissatisfaction factor areas,
    wherein the act of determining at least one dissatisfaction factor associated with the picked up image or the portion of the picked up image includes
        determining an area in the picked up image corresponding to a position wherein the user touches to define an inspection area,
        analyzing at least one of (A) the picked up image in the inspection area and (B) settings of the photographing apparatus to obtain an analysis result, and
        searching a database using the analysis result to obtain the at least one dissatisfaction factor, and
    wherein the analysis result includes characteristics of the picked up image selected from a group of characteristics consisting of (A) a level and balance as a result of photoelectric conversion, (B) a difference between pixels and areas, (C) resolution sensitivity (D) contrast to a compression rate, (E) contrast to a number of effective pixels, and (F) contrast to pixel addition.

8. The method of claim 7 wherein the analysis result includes characteristics of the picked up image obtained by setting of at least one photography parameter used when obtaining the picked up image.

9. The method of claim 7 wherein the analysis result includes characteristics of the picked up image obtained by analysis of the portion of the picked up image.

10. The method of claim 7 wherein for each of the determined at least one dissatisfaction factor, the corresponding touchable dissatisfaction factor area is an icon button.

11. The method of claim 7 wherein the display of the touchable operation assistance area to correct the dissatisfaction factor associated with the touched one of the at least one touchable dissatisfaction factor areas replaces the display of the at least one touchable dissatisfaction factor area correspond to the determined at least one dissatisfaction factor.

12. A method for controlling a touch panel display in a photographing apparatus including an image pickup unit for picking up an image of an object to obtain a picked up image, the method comprising:
    displaying, with the touch panel display, for each of the determined at least one dissatisfaction factor associated with the picked up image or the portion of the picked up image, a corresponding touchable dissatisfaction factor area;
    receiving, with the touch panel display, a user touch of one of the at least one touchable dissatisfaction factors;
    responsive to receiving the user touch of one of the at least one touchable dissatisfaction factor areas, displaying, with the touch panel display, a touchable operation assistance area to correct the dissatisfaction factor associated with the touched one of the at least one touchable dissatisfaction factor areas; and
    receiving, via the touch panel display, a user touch of the touchable operation assistance area, which is used to trigger the transmission of an instruction for setting a parameter of the photographing apparatus to correct the dissatisfaction factor associated with the touched one of the touchable dissatisfaction factor areas,
    wherein at least one dissatisfaction factor associated with the picked up image or the portion of the picked up image was determined by
        determining an area in the picked up image corresponding to a position wherein the user touches to define an inspection area,
        analyzing at least one of (A) the picked up image in the inspection area and (B) settings of the photographing apparatus to obtain an analysis result, and
        searching a database using the analysis result to obtain the at least one dissatisfaction factor, and
    wherein the analysis result includes characteristics of the picked up image selected from a group of characteristics consisting of (A) a level and balance as a result of photoelectric conversion, (B) a difference between pixels and areas, (C) resolution sensitivity (D) contrast to a compression rate, (E) contrast to a number of effective pixels, and (F) contrast to pixel addition.

\* \* \* \* \*